United States Patent [19]

Riedel et al.

[11] Patent Number: 5,656,219
[45] Date of Patent: Aug. 12, 1997

[54] PROCESS FOR PRODUCING DENSELY SINTERED SILICON NITRIDE COMPONENTS

[75] Inventors: Günter Riedel, Kelkheim/Ts.; Hartmut Krüner, Eppstein/Ts.; Cornelia Boberski, Liederbach; Friedrich Hessel, Mainz; Wolfgang Böcker, Eppstein/Ts.; Jürgen Heinrich, Selb; Matthias Steiner, Selb; Petra Dötsch, Selb; Ottmar Rosenfelder, Selb, all of Germany

[73] Assignee: Hoechst Aktiengesellschaft, Frankfurt am Main, Germany

[21] Appl. No.: 531,699

[22] Filed: Sep. 21, 1995

Related U.S. Application Data

[63] Continuation of Ser. No. 193,594, Feb. 9, 1994, abandoned

[30] Foreign Application Priority Data

Feb. 11, 1993 [DE] Germany ............ 43 04 033.0

[51] Int. Cl.$^6$ .................. B28B 1/26; B28B 1/24; C04B 33/32
[52] U.S. Cl. ............................... 264/666; 264/667
[58] Field of Search .................. 264/63, 65, 66, 264/60; 501/97, 98

[56] References Cited

U.S. PATENT DOCUMENTS 5,114,888  5/1992  Mizuno et al. ............ 501/96

FOREIGN PATENT DOCUMENTS

| 0 079 678 | 5/1983 | European Pat. Off. . |
| 0 336 377 | 10/1989 | European Pat. Off. . |
| 0 388 214 | 9/1990 | European Pat. Off. . |
| 0 419 757 | 4/1991 | European Pat. Off. . |
| 41 26 510 | 2/1993 | Germany . |
| 59-18165 | 1/1984 | Japan . |

*Primary Examiner*—Christopher A. Fiorilla
*Attorney, Agent, or Firm*—Foley & Lardner

[57] ABSTRACT

In the process for producing a homogeneous and finely crystalline silicon nitride ceramic, ceramic powder is milled, mixed with shaping aids, the mixture is shaped into parts and the shaped parts are subsequently sintered in a nitrogen atmosphere. According to the invention, sintering is carried out in a multistage process at temperatures $T_{max}$ in the range from 1700° to 1900° C. using gas pressures in the range from 0.3 to 50 MPa. In a first temperature stage, a temperature from 0.9 to 0.96·$T_{max}$ is maintained over a time period from 10 to 50 minutes at an $N_2$ pressure from 0.2 to 1.2 MPa, while in a second temperature stage a temperature from 0.97 to 0.985·$T_{max}$ is maintained over a time period from 20 to 80 minutes at an $N_2$ pressure from 3 to 6 MPa. Then the temperature is increased to $T_{max}$ and the pressure is increased to from 7 to 50 MPa.

11 Claims, No Drawings

PROCESS FOR PRODUCING DENSELY SINTERED SILICON NITRIDE COMPONENTS

This application is a continuation of application Ser. No. 08/193,594, filed Feb. 9, 1994 now abandoned.

The present invention relates to a process for producing a homogeneous and finely crystalline silicon nitride ceramic, in which ceramic powder is milled, mixed with shaping aids, the mixture is shaped into parts and the shaped parts are subsequently sintered in a nitrogen atmosphere. The invention also relates to shaped parts produced according to the process.

DE-A-42 34 794 discloses that, for the production of silicon nitride components which, because of their high strength, are able to resist very special mechanical stresses, many different process parameters have to be optimally matched to one another. In particular, during the sintering step, the temperature and nitrogen pressure settings have to be set as a function of the slowly increasing density of the shaped part.

EP-A-079 678 describes a process for sintering silicon nitride ceramic with sintering additives in the form of oxides of the elements Mg, Al, Y, Ce or Be and/or nitrides or carbides of elements of the groups IVa, Va and VIa of the Periodic Table of the Elements. The sintering process described is distinguished by a continuous temperature increase and three pressure stages. However, since a combined holding time for pressure and temperature is not provided in the context of these directions, the components produced in accordance therewith achieve only a moderate level of strength.

It is an object of the present invention to organize the individual steps of the ceramic production process for shaped parts made of silicon nitride and to define the technological parameters of the overall process in such a way that, in the components produced in this manner, a homogeneous distribution of the sintering additives and a finely crystalline microstructure are achieved and also the number and size of the fracture-triggering structural defects are reduced sufficiently for a strength level $\geq 900$ MPa, when using specially optimized raw powder mixtures a $\geq 1200$ MPa in particular, to be reproducibly achieved.

The object is achieved by a process of the type mentioned in the introduction, the defining features of which are that sintering is carried out in a multistage process at temperatures in the range from 1700° to 1900° C. in a nitrogen atmosphere using gas pressures in the range from 0.2 to 50 MPa, where in a first temperature stage a temperature from 0.9 to $0.96 \cdot T_{max}$, preferably $0.945 \cdot T_{max}$, is maintained over a time period from 10 to 50 minutes, preferably from 12 to 25 minutes, at an $N_2$ pressure from 0.2 to 1.2 MPa, preferably from 0.3 to 0.6 MPa, and where in a second temperature stage a temperature from 0.97 to $0.985 \cdot T_{max}$, preferably of $0.975 \cdot T_{max}$, is maintained over a time period from 20 to 80 minutes, preferably from 30 to 50 minutes, at an $N_2$ pressure from 3 to 6 MPa, preferably from 4 to 5 MPa, and that subsequently the temperature is increased to $T_{max}$ and the pressure is increased to from 7 to 50 MPa, preferably to from 7 to 10 MPa.

The pressure holding time in the final stage is from 30 to 100 minutes, preferably from 60 to 90 minutes. The heating rates lie in the range from 5 to 35 K/min and the pressure is increased at a rate from 0.25 to 1.2 MPa/min, preferably from 0.5 to 1.1 MPa/min. The heating to temperatures in the range from 800° to 1200° C. is carried out in vacuo and then up to the first temperature stage under an $N_2$ pressure from 0.3 to 0.6 MPa.

A multistage sintering cycle with different $N_2$ pressures is also described in the above-cited patent document DE-A-42 34 794. According to said document, the level of the maximum gas pressure is set as a function of the densification achieved in the shaped body, derived from the shrinkage profile of the dilatometer curves, in such a way that the gas pressure is from 0.1 to $0.3 \cdot P_{max}$ on reaching 85% of the theoretical density and from 0.2 to $0.4 \cdot P_{max}$ on reaching 93% of the theoretical density, $P_{max}$ lying in the range from 5 to 10 MPa.

In contrast, however, according to the present invention the pressure is only in the range from 0.03 to $0.086 \cdot P_{max}$ when the density reached is 90%. Accordingly, a densification of 85% is, according to the invention, reached below $0.1 \cdot P_{max}$. According to the present invention, a densification of 93% of the theoretical density is present after setting the second temperature stage and increasing the pressure to from 0.42 to 0.86 $P_{max}$. The parameters temperature, nitrogen pressure and time are, according to the invention, preferably are coordinated in such a way that high-density homogeneous and finely crystalline $Si_3N_4$ shaped parts can be produced at residence times above 1700° C. in the range from 75 to 135 minutes.

For the purposes of the present invention, nitrogen atmosphere is pure nitrogen or an atmosphere which consists essentially of nitrogen and which can contain nonoxidizing gases such as noble gases or hydrogen as further components. The prescribed pressures are in each case total pressure and not partial pressure.

For the purposes of the present invention, it has also been found to be particularly advantageous to use $Si_3N_4$ starting powder having high purity and good sinteractivity, with sintering additives in the form of $Al_2O_3$ and at least one further oxide of group IVb of the Periodic Table also being added. The mixture is dispersed, mixed and milled or deagglomerated in aqueous suspension. Preferably, predispersion is carried out with intensive stirring and the mixing-milling procedure is carried out in mills, to make possible the elimination of agglomerates $\geq 2$ µm and to achieve homogeneous mixing of the individual components. Contrary to the general view that as high as possible a comminution intensity leads to homogeneous sintered bodies having high strength, it was possible to show that the component properties desired according to the object can be achieved, using the sintering conditions of the invention, by the combination of pH monitoring during the whole preparation process with the addition of organic dispersants for the controlled setting of negative zeta potentials of the inorganic solid particle end the limiting of the comminution energy introduced during the preparation process.

The gentle milling procedure ensures that the oxygen absorption during processing in the aqueous medium remains less than 0.75%, preferably $\leq 0.5\%$. The proportion of particles $\geq 1$ µm in the milled product is <8%, preferably $\leq 3\%$, with the particle size being advantageously measured by means of laser light scattering. The combination of electrostatic and mechanical deagglomeration mechanisms makes it possible to achieve a more homogeneous distribution of the sintering additives in the aqueous suspension and subsequently in the shaped and sintered parts.

The dispersants used can be, for example, a polymer of α,β-ethylenically unsaturated carboxylic acids, preferably salts thereof, or can be water-soluble copolymers with esters of the ethyl ethylenically unsaturated carboxylic acids.

If the shaping method to be used is dry pressing, first a free-flowing and readily pressable granular material is produced by spray-drying or fluidized-bed granulation. The selection of the organic shaping acids required, namely binders, plasticizers and lubricants, is of particular importance in respect of the maximum achievable strength values in the fully sintered shaped parts.

The shaping aids should, to avoid flocculation and reagglomeration processes, be compatible with the dispersants used and augment their action with regard to the deagglomeration of the inorganic solid particle with an additional electrostatic and/or steric effect. In addition, the suspensions should be processed into free-flowing, readily pressable and very soft granulated materials, using suitable drying conditions. The formation of hard agglomerates which lead to defects, including, inter alia, ring or crescent pores, or to areas having different degrees of densification in the final sintered body must be absolutely avoided. This is generally possible with known suitable combinations of organic polymers containing as binders, for example, polyvinyl alcohols, polyoxazolines, cellulose derivatives, alginates, polysaccharides or monocarboxylic esters, in combination with plasticizers, for example glycerol or polyethylene glycol, and/or lubricants such as olein, oleic acid, stearic acid, stearates, waxes or wax dispersions, and also with drying and granulation conditions matched to each case.

It is often claimed that the achievement of a high density in the unfired shaped parts is an indispensable prerequisite for achievement of high mechanical strengths in the final fired shaped parts. However, it has surprisingly been found that this is not always the case in direct comparison of specific organic additives using specific pressure-sintering conditions. For instance, with a binder in the form of a water-dispersible polyester urethane in combination with polyoxazoline and/or a fatty acid/polyethylene glycol mixture and the green density at 56.5% of the theoretical density it was possible to achieve the same level of strength in the sintered shaped parts at lower pressing pressures than with known binders containing polyvinyl alcohol and glycerol as plasticizer, which led to green densities of 61.5% of the theoretical density. According to the invention, the production of these shaped parts can be carried out not only by axial pressing but also, particularly for rotationally symmetrical parts having large length-to-thickness ratios, by isostatic pressing in such a way that the number and size of structural defects which limit the strength are minimized or the defects are completely eliminated.

EP-A-388 214 describes the use of polyoxazolines as binders for inorganic solids dispersed in organic solvents with the aim of producing shaped bodies having high green density and strength, whereas the present invention relates to systems in aqueous dispersions. Also surprising is the advantageous use of the polyoxazolines in combination with polyester urethanes and/or fatty acid/ polyethylene glycol dispersions and also their effect on the mechanical strength of sintered shaped bodies by avoidance of structural defects.

Direct proof of the action claimed according to the invention for avoiding structural defects which limit strength is, in the final analysis, only to be found in the relationship between flexural fracture strength achieved, or fracture stress, and size and position of the fracture-triggering flaws. Typical shaping defects such as granule "ghosts" (flaws caused by differential sintering of granules) lie in the size range from 20 to 80 µm (depending on granule size). If these are positioned in the region of maximum tensile stress during 4-point bend testing, they would limit the strength of these materials to 1000 or 500 MPa. This results from the known relationship:

$$\sigma_f = \frac{K_{IC}}{F \cdot \sqrt{\pi} \cdot a_c}$$

with $\sigma_f$=fracture stress (strength)
$K_{IC}$=critical stress intensity factor
F=shape factor ($\approx 1.13$)
$a_c$=critical flaw size These types of flaws could also be detected on polished sections of the sintered shaped parts by optical microscopy using 100×magnification and cannot be found in shaped parts prepared, pressed and densely sintered according to the invention.

Other shaping processes which do not start with intermediately dried products (for example granules) can be seen as non-critical with regard to the abovementioned structural defects, but, that if they are not carried out properly, other possible faults can likewise arise.

In slip casting, the slip prepared according to the invention can, by setting the solids content to from 40 to 60% by volume and adding of polymer in the form of, for example, waxes or cellulose derivatives, be cast and dewatered directly in plaster molds or, by means of pressure casting, in synthetic molds. However, it is also possible to dewater the prepared and dispersant-containing slip without further additions of polymer, for example in a spray dryer, and to redisperse the material required for shaping by casting.

This applies likewise to the production of an injection molding compound. The prepared and dried material is intensively mixed with polymer additives or their combination with waxes, paraffins, phthalates, stearic and/or oleic acids, polyoxymethylene and the like in compounders or extruders and subsequently shaped using injection pressures in the range from 5 to 2000 bar.

Depending on the type and amount of the polymer additives used as shaping aids, these additives are burnt out prior to sintering using cycle times of different lengths in an oxidizing or inert atmosphere at a maximum temperature of 1000° C., preferably of 500° C., with or without the use of loose powders such as aluminum oxide as bedding material to shorten the cycle times.

To avoid concentration gradients and/or re-formation of pores by the formation and vaporization of volatile components in the form of Si or $SiO_x$, the proportion by volume of $Si_3N_4$ shaped bodies to be sintered, based on the total volume of the crucible containing the product to be sintered, should be as high as possible. The crucible material used can be boron nitride, graphite coated with boron nitride, or silicon nitride.

To increase the proportion by volume of $Si_3N_4$, the shaped bodies can also be bedded into a loose powder of $Si_3N_4$ with particle sizes from 0.3 to 5 mm which preferably contains more than 20% of the sintering additives present in the shaped part. According to the invention, the firing aids used can also be $Si_3N_4$ parts which have already been suitably shaped and sintered, with or without sintering additives, in the case of cylindrical shaped parts, particularly also in the form of sleeves.

The shaped parts produced according to the process of the invention preferably possess a very fine-grained microstructure which has an average grain width $\leq 0.6$ µm, preferably $\leq 0.3$ µm, and the number of grains per unit area is $\geq 0.95 \cdot 10^6$, preferably $\geq 4 \cdot 10^6$, grains/mm². Contrary to the prevailing opinion that average aspect ratios of more than 8 are advantageous for high strengths, it was found according to the invention that average aspect ratios of only from 5 to 7.8 lead to the high mechanical strengths desired according to the invention.

A further microstructural feature of the shaped parts produced according to the process of the invention is a narrow crystallite width distribution with preferably 95% of the crystallites lying in the range from 0.05 µm to 0.5 µm and the maximum grain width being preferably ≦1.5 µm. The microstructural features are determined on polished and plasma-etched sections of the sintered shaped parts by microscopy using a magnification of 5000×.

The amorphous grain boundary phase formed from the oxidic sintering additives and the $SiO_2$ at the surface zone of the $Si_3N_4$ particles is very finely distributed in the fully sintered shaped parts as a result of the production process of the invention. This is shown by the fact that the thickness of the amorphous grain boundary phase at the triple points is 0.2 µm on average.

The combination of the process features of the invention and the reduction thus achieved in strength-limiting structural defects makes it possible, on the basis of a proportion from 8 to 12% by weight of sintering additives, to produce shaped parts having flexural fracture strengths ≧1200 MPa. Peak values can even lie above 1300 MPa (four-point bend test in accordance with DIN 51110; tensile side of the test pieces polished).

It has surprisingly been found that the temperature/ time/ pressure cycle of the invention during sintering results in a part of the $Al_2O_3$ introduced into the batch of compound (from 30 to 70% of the total amount, determined by STEM) being dissolved in the $Si_3N_4$ crystallites. This circumstance contributes significantly to the improvement in the mechanical properties of the fully sintered shaped parts at elevated temperatures.

The $K_{IC}$ values of the shaped parts lie in the range from 7.5 to 11 MPa·√m (test in accordance with DIN 51109). Owing to the high thermal conductivity of 20 W/m·K and the very low linear coefficients of thermal expansion of $2.4 \cdot 10^{-6}$/K (measured in the range from 20° to 1000° C.), the shaped parts produced according to the process of the invention also possess very good thermal shock resistance. Their elastic modulus is 310 GPa, while their mechanical flexural fracture strength lies in the range from 850 to 1000 MPa at test temperatures of 1000° C.

The shaped parts produced by the process of the invention are particularly suitable for use in the construction of machines, plants and engines and also specifically as inlet and exhaust valves in combustion engines.

Embodiments of the invention will now be more particularly described by way of example, without implying any limitation to the concrete embodiments presented.

EXAMPLE 1

610.5 parts by weight of the oxidic components of the powder mixture specified in Table I were predispersed in an initially charged amount of water of 3.25 parts by volume containing 0.5% of polycarboxylic acid (from BK Ladenburg GmbH) as dispersant (active content 25%) for 20 minutes by means of a stirrer (dissolver). The continuous addition of 5265 parts by weight of $Si_3N_4$ powder type B was then carried out by means of a metering screw over 10 minutes. After a further dispersion time of 30 minutes, the predispersed slip was pumped into a stirred ball mill having a capacity of 4 parts by volume. The mill possessed a lining and milling disks made of $Si_3N_4$. The milling space was filled with $Si_3N_4$ milling balls having a size from 1 to 2 mm. Using a container fitted with stirrer, milling was carried out with circulation of the slip for an effective milling time of 75 minutes.

After milling is complete, 0.5% by weight of polyvinyl alcohol (®Mowiol GE 4–86, from Hoechst AG, Frankfurt/Main) and 1% of glycerol, based on the solids contained in the slip, were added to the slip. Other processing parameters and associated measured values are shown in Table 1. Spray-drying was then carried out by means of a two-fluid nozzle under the following conditions:

Air inlet temperature: 200° C.

Air outlet temperature: 90° C.

Slip throughput: 3.3 kg/h

Air flow (nozzle): 2.9 kg/h

The granular material prepared in this manner possesses the following properties:

Bulk density: 0.97 g/cm³

Flow time through a 7 mm orifice: 4.5 s/100 g

Residual moisture: 0.8%

Granule size:

$d_{10}$: 29 µm $d_{50}$: 64 µm $d_{90}$: 105 µm

Proportion of fines <24 µm: 6%.

The granular material was then shaped by isostatic pressing at a pressing pressure of 2000 bar to give cylindrical bodies having a diameter of 13 mm and a length of 120 mm.

After burning out the organic pressing aids, sintering was carried out under the following conditions:

$T_{max}=1865°$ C.;

First temperature stage: $0.945 \cdot T_{max}$ for a time period of 17 minutes, at an $N_2$ pressure of 0.4 MPa;

Second temperature stage: $0.975 \cdot T_{max}$ for a time period of 40 minutes at an $N_2$ pressure of 4.5 MPa;

Temperature increase to $T_{max}$ and pressure increase to 10 MPa for a pressure holding time of 15 minutes.

The properties of the shaped parts achieved in this manner are shown in detail in Table 2.

EXAMPLE 2

The starting powders were mixed and milled in accordance with Example 1 and after completion of milling were spray-dried under the same conditions as in Example 1 but without further addition of polymer.

The abovementioned powder having a solids content of 65% by weight was then redispersed. Based on the weight of powder used, 0.5% of a dispersant KV 5088, from Zschimmer & Schwarz GmbH, Lahnstein, and 3% of KST wax (Hoechst AG) were then added. The slip was homogenized by stirring for 2 hours and was then cast into bars in conventional plaster molds. After 1 hour, the green parts were removed from the molds, dried over a time period of 24 hours at a temperature of 30° C. and sintered as in Example 1.

EXAMPLE 3

Powder preparation and drying were carried out as in Example 2. The material was then intensively mixed with organic components in a compounder over a time of 2 hours at a temperature of 190° C. The composition of the organics was as follows:

74.3% of polyoxymethylene 52021 (from Hoechst AG)

19.2% of polyethylene glycol (Hoechst AG)

6.4% of Mikrowachs C (from Hoechst AG)

The material granulated by cooling in the compounder was then injection-molded into bars in an injection-molding machine at a nozzle temperature of 185° C. using an injection pressure of 135 MPa. The green parts were heated to 400° C. over a time of 48 hours in a burn-out furnace, completely removing the organic components. Sintering was carried out in accordance with Example 1; the resulting properties of the shaped parts are shown in Table 2.

EXAMPLE 4

$Si_3N_4$ powder type A is mixed with sintering additives, milled and spray-dried in accordance with Example 1 under the conditions specified in Table 1 for powder A.

Prismatic parts having dimensions of 20×20×55 mm were pressed at 2500 bar using the isostatic wet-bed method and sintered under conditions changed as follows from Example 1:

The holding time in all 3 temperature stages was 40 minutes. The pressure build-up was to 1.2 MPa on reaching the first temperature stage and to 5 MPa after sintering had proceeded for ¼ of the holding time of the second temperature stage. The pressure was then increased to 8 MPa and kept constant until the end of the temperature holding time. The properties of the shaped parts resulting therefrom are shown in Table 2.

TABLE 1

Powder properties, chemical composition of the powder mixture, preparation parameters:

| Powder properties | Type A | Type B |
| --- | --- | --- |
| Proportion of α-$Si_3N_4$ [%] | 96.5 | 98 |
| Oxygen content [%] | 1.8 | 1.5 |
| Carbon content [%] | 0.15 | 0.1 |
| Cationic impurities [%] | 0.05 | 0.025 |
| Average particle size [μm][1] | 0.3 | 0.45 |
| Specific surface area [m²/g] | 19.3 | 12 |
| Powder mixture: | | |
| $Si_3N_4$ [by weight] | 87.5 | 87.7 |
| $Y_2O_3$ [% by weight] | 8.2 | 8.2 |
| $Al_2O_3$ [% by weight] | 4.1 | 4.1 |
| $HfO_2$ [% by weight] | 0.2 | — |
| Preparation: | | |
| Solids content [%] | 65 | 65 |
| pH | 10 | 9.5 |
| Effective milling time [min] | 75 | 75 |
| Abrasion of milling balls [% based on solids] | 0.2 | 0.2 |
| Specific surface area of millbase [m²/g] | 19.5 | 14 |
| Increase in oxygen content [%] | 0.65 | 0.5 |
| Average particle size of millbase [μm] | 0.3 | 0.38 |
| Proportion of particles > 1 μm [%] | 1.0 | 2.5 |

[1])Measurement method: laser light scattering

TABLE 2

Properties of the shaped parts:

| Example No. | 1 | 2 | 3 | 4 |
| --- | --- | --- | --- | --- |
| Density [% of theoretical density] | 99.2 | 99.0 | 98.8 | 99.0 |
| Flexural fracture strength[1] [MPa] at room temperature | 1308 | 1312 | 1180 | 943 |
| Weibull modulus | 20 | 22 | 25 | 26 |
| Fracture toughness[2] $K_{IC}$ [MPa · √m] | 9 | 8.8 | 8.5 | 7.5 |

TABLE 2-continued

Properties of the shaped parts:

| Example No. | 1 | 2 | 3 | 4 |
| --- | --- | --- | --- | --- |
| Microstructural parameters: | | | | |
| Aspect ratio[3] | 6.5 | 7.5 | 7.0 | 5 |
| Average grain width [μm] | 0.22 | 0.25 | 0.32 | 0.6 |
| Number of grains [10⁶/mm²] | 5.3 | 4.5 | 3.5 | 0.95 |

[1])Test in accordance with DIN 51110
[2])Test in accordance with DIN 51109
[3])Ratio of crystallite length to crystallite width, determined by measurement of at least 40 crystallites having parallel crystallite edges in a scanning electron micrograph depicting a micro-structure in a magnification of 5000×.

What is claimed is:

1. A process for producing a homogenous and finely crystalline silicon nitride ceramic in which ceramic powder is milled, mixed with shaping aids, the mixture is shaped into parts and the shaped parts are subsequently sintered in a nitrogen atmosphere, which comprises carrying out sintering in a multi-stage process at temperatures $T_{max}$ in a range from 1700° to 1900° C. using gas pressures in a range from 0.2 to 50 MPa, wherein in a first stage, a first temperature from 0.9 to 0.96·$T_{max}$ is maintained over a first time period from 10 to 50 minutes at a first $N_2$ pressure from 0.2 to 1.2MPa, and then in a second stage, said first temperature is increased to a second temperature from 0.97 to 0.985·$T_{max}$ is maintained over a second time period from 20 to 80 minutes at a second $N_2$ pressure from 3 to 6 MPa, and then increasing the second temperature to a third stage having a third temperature of $T_{max}$ and increasing the second pressure to the third stage having a third pressure of from 7 to 50 MPa.

2. The process as claimed in claim 1, wherein from a temperature of 1000° C. up to the first temperature stage there is an $N_2$ pressure from 0.3 to 0.6 MPa, in the first temperature stage a first temperature of 0.945·$T_{max}$ is maintained over a first time period from 12 to 25 minutes at a first $N_2$ pressure from 0.3 to 0.6 MPa, in the second temperature stage a second temperature of 0.975·$T_{max}$ is maintained over a second $N_2$ pressure from 4 to 5 MPa, and then the second temperature is increased to the third temperature of $T_{max}$ and the pressure is increased to a third pressure of from 7 to 10 MPa.

3. The process as claimed in claim 1, wherein a holding time of the third pressure in the third stage is from 30 to 100 minutes, a heating rate from said second to said third stage lies in a range from 5 to 35 K/min and a pressure from said second to said third stage is increased at a rate from 0.25 to 1.2 MPa/min.

4. The process as claimed in claim 3, wherein the holding time in the third stage is from 60 to 90 minutes.

5. The process as claimed in claim 3, wherein the pressure form said second to said third stage is increased at a rate from 0.5 to 1.1 MPa/min.

6. The process as claimed in claim 1, wherein a mixture of high-purity $Si_3N_4$ starting powder having good sinteractivity and containing sintering additives in a form of $Al_2O_3$ and at least one further oxide of group IVb of the Periodic Table is dispersed, mixed and milled or deagglomerated in aqueous suspension in a pH range from 8 to 10.5 in such a way that oxygen absorption during processing remains less than 0.75%, preferably ≦0.5%, and that a proportion of particles ≧1 μm in the milled product is <8%, with polymers of α, β-ethylenically unsaturated carboxylic acids, preferably salts thereof, or water-soluble copolymers with esters of the ethylenically unsaturated carboxylic acids being used as a dispersant.

7. The process as claimed in claim 6, wherein said sintering additives which includes $Al_2O_3$ are present in an amount from 8 to 12.5 weight percent based on the total amount of the sintered ceramic.

8. The process according to claim 6, wherein the proportion of particles ≧1 mm in the milled product is ≦3%.

9. The process as claimed in claim 1, wherein shaping is carried out by means of slip casting, pressure filtration, sheet casting, extruding, injection-molding or dry pressing.

10. The process as claimed in claim 9, wherein a water-dispersible polyester urethane in combination with a polyoxazoline and/or a fatty acid/polyethylene glycol dispersion is used in an amount from 0.5 to 10% by weight, based on a total weight of the powder to be shaped, as a shaping aid in dry pressing, and a compaction of components having rotational symmetry is carried out with an aid of isostatic pressing.

11. The process as claimed in claim 1, wherein said shaping is carried out by means of pressure slip casting.

* * * * *